Patented Oct. 7, 1930

1,777,805

UNITED STATES PATENT OFFICE

LESLIE ROBERT MORSHEAD, OF LONDON, ENGLAND

APPARATUS FOR THE PROJECTION OF LIGHT

Application filed January 3, 1930, Serial No. 418,375, and in Great Britain December 29, 1928.

This invention relates to apparatus for the projection of light in which converging crossing beams are produced such as are obtained by projector apparatus comprising a plurality of concentrically disposed truncated ellipsoidal reflectors having their foci coincident, which may be used in conjunction with a refracting system adapted to refract the cone of rays which do not fall upon the reflector system, and with a hemispherical reflector disposed to the rear of the said reflector system with its centre of curvature at the said coincident foci, a source of light being disposed at the said coincident foci. Such a projector system is described in the specification of the application for U. S. Patent No. 135,414. By such means a highly intense converging crossing beam is efficiently obtained.

The present invention relates more particularly to means employed for spot and flood lighting, in which the angle of the projected beam is considerably smaller than the full angle of 180°, which is necessary in order to utilize with full advantage the whole of the light obtained from a source of light such as an electric incandescent lamp when operating in conjunction with a rear hemispherical reflector. Except when employed for open flooding purposes, other known types of apparatus for spot or flood lighting which, as is normally required, project a full beam without a central dark zone, necessarily operate at a considerable disadvantage in loss of intensity in the projected beam, which disadvantage increases as the beam angle is reduced.

The apparatus usually employed for spot or flood lighting, more particularly for projecting beams of angles varying from, say, 90° to zero or parallel, is of a simple type consisting of a source of light, such as an arc or incandescent lamp, adjustably mounted behind a focussing system, comprising a simple or compound lens arrangement, the source of light in the case of incandescent lamp projection being provided with a rear hemispherical reflector, which is of course not required or utilized in the case of electric arc projection. With such spot or flood lighting, if a relatively wide angle projected beam be required it is obtained by moving the source of light close up to the frontal lens, or focussing system, with the consequence that very heavy losses in transmitted light intensity result, inasmuch as under no conditions can the whole zone of light emitted from the source be utilized by any available type of projecting lens. When, however, an extremely narrow beam approaching to parallel is required, a relatively much greater loss of light results owing to the fact that the source of light must be removed a considerable distance away from the projecting lens, which therefore utilizes a much smaller proportion of the whole zone of emitted light.

According to the present invention converging crossing beams are utilized, for which purpose the optical projection system is so provided in relation to the source of light that a large proportion of the total light emitted by the source of light employed is projected in a highly intense beam of relatively narrow angle.

According to the invention a lens is adjustably mounted in relation to and in front of the optical projection system in a position forward of the crossing point of the converging beam derived from the projection system. It may, however, be so provided as to be adapted to move also to the rear of the said crossing point.

According to the invention, moreover, the projector is provided with an aperture which may be adjustable and which serves to focus or control the converging beam, the said aperture being adapted to be positioned at the point of crossing of the beam, or in a position adjacent thereto. Thus, when the aperture is positioned at the point of crossing where the beam has a core or inner portion of high intensity, the aperture may be adjusted to permit of the focussing of the beam to a spot light of unusually narrow angle of high intensity, while if the aperture be moved rearwardly of the point of crossing, it may be used to control the beam at a point at which it is of a more uniform, if less intense, character, so that a focussed spot light of wider angle, but of less intensity, may be obtained.

The invention is especially applicable to an equivalent spherical light source, such as an electric incandescent lamp which may thereby be substituted for the electric arc now still largely employed for theatre, studio, and other types of spot and flood lighting where high intensities of illumination are required with long throws and with large areas.

The invention is, however, applicable to arc projection with respect to which the invention has among its objects to obtain efficiency in the use of existing types of light projection apparatus.

The invention comprises the features of method and apparatus hereinafter described.

The accompanying diagrammatic drawings illustrate a projector provided in accordance with the invention, by way of example.

In carrying the invention into effect a relatively small diameter lens $a$ of suitable refracting power is selected and is adjustably mounted in relation to and in front of the optical projection apparatus $b$ from which the crossing beam is derived, including the source of light $c$. Assuming that the lens $a$ is a positive lens of a simple type such as plano-convex, or bi-convex, and is located concentric with and at the crossing point of the projected beam, it will have a negligible refracting effect, and therefore will not change the beam angle. If, however, the lens is advanced beyond the crossing point away from the source of light it will refract the beam to an increasing extent in proportion to its advancement, until it reaches a limit in accordance with its refracting power and focal length. Under these conditions, if the angle of the crossing beam is suitably related to the refracting power of the objective lens $a$ a substantially parallel beam is projected suitable for spot lighting, in which the full power and intensity of the projected beam is efficiently employed.

If the lens is now brought back towards the crossing point, the emerging beam opens out to an angle which may be suitable for enlarged spot or flood lighting. When the crossing point is again reached, the beam will be projected at full angle as derived from its projection apparatus which, in many cases, will be sufficiently wide to meet the maximum requirements of flood lighting.

If, however, it be desired to open out the emerging beam angle still further for wide angle flooding, the lens may be moved behind the crossing point towards the source of light, with the result that the emerging beam angle will gradually be increased beyond the normal angle of projection.

It will be understood that the lens or focussing system may be either adjustably mounted in relation to the source of light and its accessory optical system or that, alternatively, the latter system may be moved in relation to the frontal lens, or focussing system, so as to produce any desired variations in beam angle within the limits of the combined apparatus.

Figure 1:
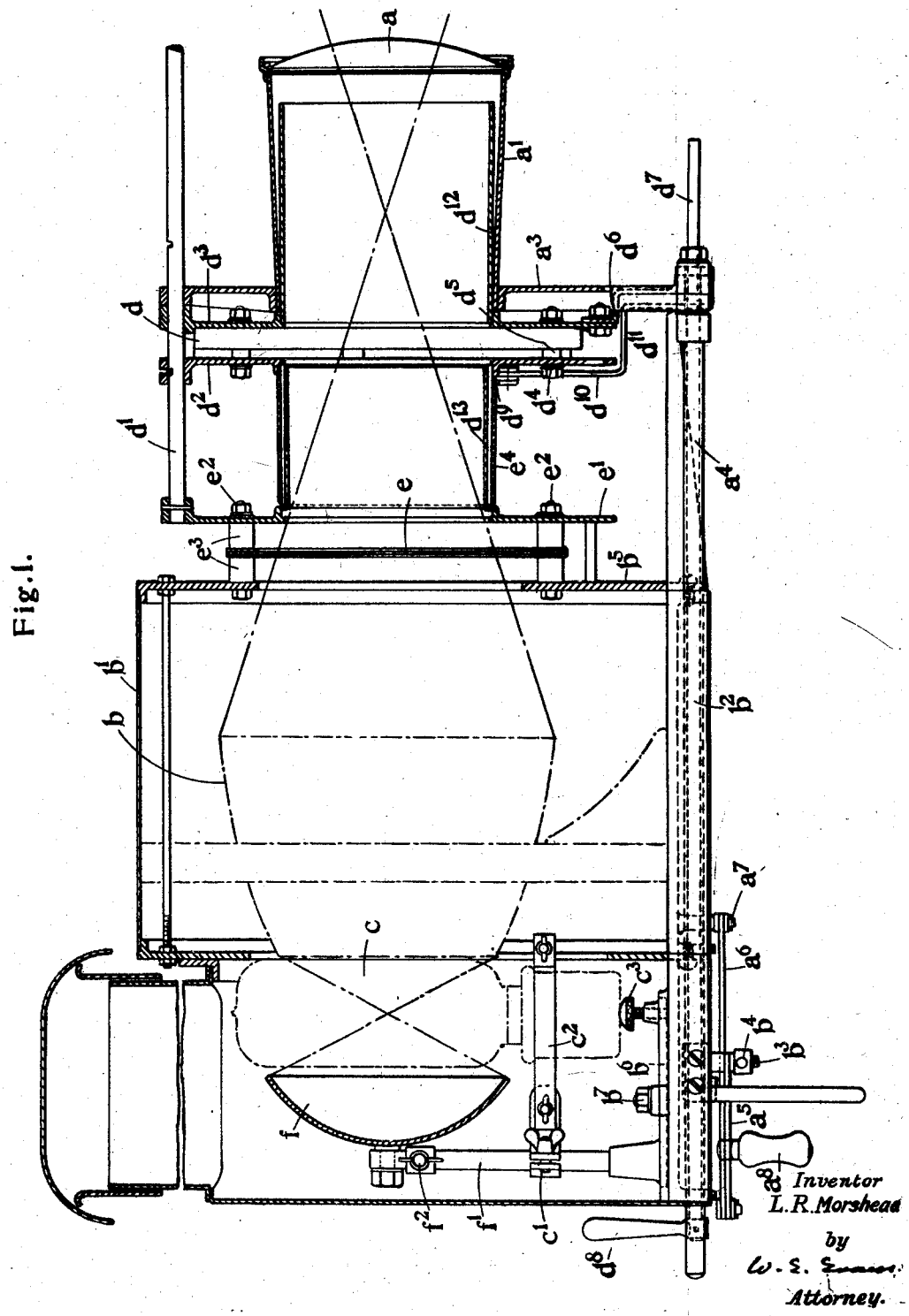
Figure 1 is a sectional side elevation of the projector.
Figure 2:
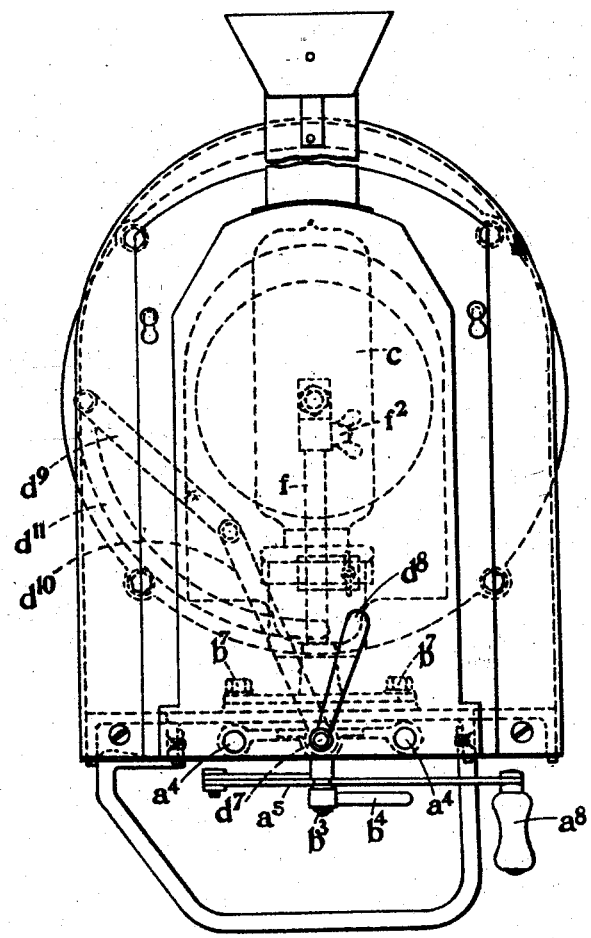
Figure 2 is an end view corresponding to Figure 1.

In the projector illustrated the lens $a$ is suitably supported so as to be adjustable relatively to the casing $b^1$ of the projector system $b$ which may be of the kind hereinbefore described adapted to give a highly intense converging and crossing beam of light as indicated in dot and dash lines in Figure 1. For this purpose the base plate $b^2$ of the casing $b^1$ is extended forwardly but of reduced cross-section and provided at the extremity with laterally disposed bearings for two parallel rods $a^4$ which are suitably connected at intervals by transverse tie members to form a substantially rectangular frame that is longitudinally slidable in the base plate $b^2$. At the forward end the rods $a^4$ are connected by a transverse upstanding fitting $a^3$ which may be in the form of a cast bracket serving to support the lens carrier $a^1$, conveniently in the form of a front cylindrical or conical casing member, having the lens mounted at the forward end. The carrier $a^1$ is advantageously removable from the fitting $a^3$ to permit other carriers with lenses of differing focal lengths to be used.

To permit the lens carrier $a^1$ to be adjusted in position relatively to the projector $b$, the rods $a^4$ are adapted to be moved longitudinally in the base plate $b^2$ by means of a bell crank lever $a^5$ pivoted to the base plate $b^2$ upon a pivot pin $b^3$, and linked by means of a link $a^6$ to a pin $a^7$ mounted upon one of the transverse members connecting the rods $a^4$. The lever $a^5$ is provided with an operating handle $a^8$ whereby the lever $a^5$ and link $a^6$ may be moved for the adjustment of the position of the rods $a^4$. A locking nut with handle $b^4$ is mounted upon the pin $b^3$.

According to the invention, also, a diaphragm $d$, for example, of the iris type, is adjustably positioned between the lens $a$ and the front plate $b^5$ of the casing $b^1$, in which is formed the beam aperture. As is illustrated in Figure 1, a plate $e^1$ is mounted upon the plate $b^5$ in a position parallel thereto, by means of bolts $e^2$ and distance pieces $e^3$, the plate $e^1$ being formed with an aperture for the passage of the beam of light. At the top the plate $e^1$ supports a rod $d^1$ upon which is slidably suspended a carrier for the diaphragm $d$, the said carrier comprising two plates $d^2$, $d^3$ disposed parallel, to one of which, $d^3$, the diaphragm casing is secured, while the other, $d^2$, is positioned in spaced relation thereto by suitable retaining bolts $d^4$ and distance pieces $d^5$. At the lower end the plate $d^3$ is secured to a bracket member $d^6$ in which is slidably and rotatably mounted, by means of a rotatable bush, a squared spindle $d^7$, the rear part of which is rotatably mounted in the base plate $b^2$ and is provided at the rear end with an operating handle $d^8$. The lower part of the fitting $a^3$ is recessed or cut away to admit the bracket member $d^6$.

The size of aperture of the diaphragm $d$ is controlled by means of a link $d^9$ of curved shape which is connected to a curved and bent arm or lever $d^{10}$ secured to and adapted to rotate with the bush before referred to upon rotation of the rod $d^7$. Thus, by movement of the handle $d^8$ the diaphragm may be adjusted to the desired diameter. The pin connecting the link $d^9$ with the operating lever of the diaphragm passes through a curved slot $d^{11}$ in the plate $d^2$.

In order to exclude extraneous rays of light when the lens $a$ is moved forward from the position shown, and the diaphragm $d$ is adjusted accordingly, the plate $d^3$ is provided to carry a cylindrical screen $d^{12}$ telescoping within the front lens carrier, casing member or section $a^1$ and the plate $a^3$, a cylindrical screen $d^{13}$ carried by the plane $e^1$ telescoping with a corresponding screen or rear casing member or section $e^4$ carried by the plate $d^2$. The casing members or sections $a^1$ and $e^4$ form a sectional light tube carrying the refracting lens and between which the diaphragm is disposed, as shown, and the part $e^4$ of the lens carrier and the part $d^{13}$ form a telescopic light tube allowing adjustment of the lens $a$ with relation to the light source without loss of light.

The distance pieces $e^3$ serve to position between the plates $b^5$ and $e^1$ a slideway holder or carrier $e$ for an obturator disc or plate which may be used for cutting out or for the protection of the diaphragm $d$ against undue heating when the beam is not actually being projected. The spaces represented by the distance pieces $e^3$ may serve for the reception of colour slides, filters or the like. A reflector $f$, shaped as a sector of a sphere, having its centre of curvature at the said focus is carried to the rear of the source of light $c$. For this purpose it is advantageously provided to be removably supported upon a pedestal $f^1$ in such manner that it may be mechanically registered in the correct position, a locking pin $f^2$, for example, serving to determine this position. The pedestal $f^1$ may also serve to carry an adjustable support for the light source, comprising a clamp or like device $c^1$ adjustable on the pedestal $f^1$, and clamping arms $c^2$ which are laterally adjustable and which engage the socket for the lamp, the vertical position of which is determined by an adjustable supporting screw $c^3$. The pedestal $f^1$ and the screw $c^3$ are conveniently mounted upon a removable platform $b^6$ provided upon the base plate $b^2$ and secured in position by bolts $b^7$, the position of the platform being also determined by suitable means such as a registering pin.

By means of the diaphragm $d$, a sharply focussed spot of light may be obtained of any desired size less than that secured with the emerging focussed beam approximately parallel and the adjustable aperture wide open.

It is advantageous to mount the colour slides or filters at the position determined by the slideway $e$, since the converging beam is of large area and therefore gives a minimum concentration of heat. Provision may be made, however, for the mounting of rotating coloured discs in position adjacent the lens $a$. For this purpose the fitting $a^3$ may serve also to carry the said discs or their mounting.

In the position that is indicated in Figure 1, the apparatus is adjusted for transport and also in the position in which it may be used for flood lighting, the aperture of the diaphragm $d$ being fully opened. The adjusted positions of the diaphragm may be determined by means of recesses or cuts formed in the rod $d^1$ with which may engage a locking pin or catch mounted upon the plate $d^2$.

Figure 3:
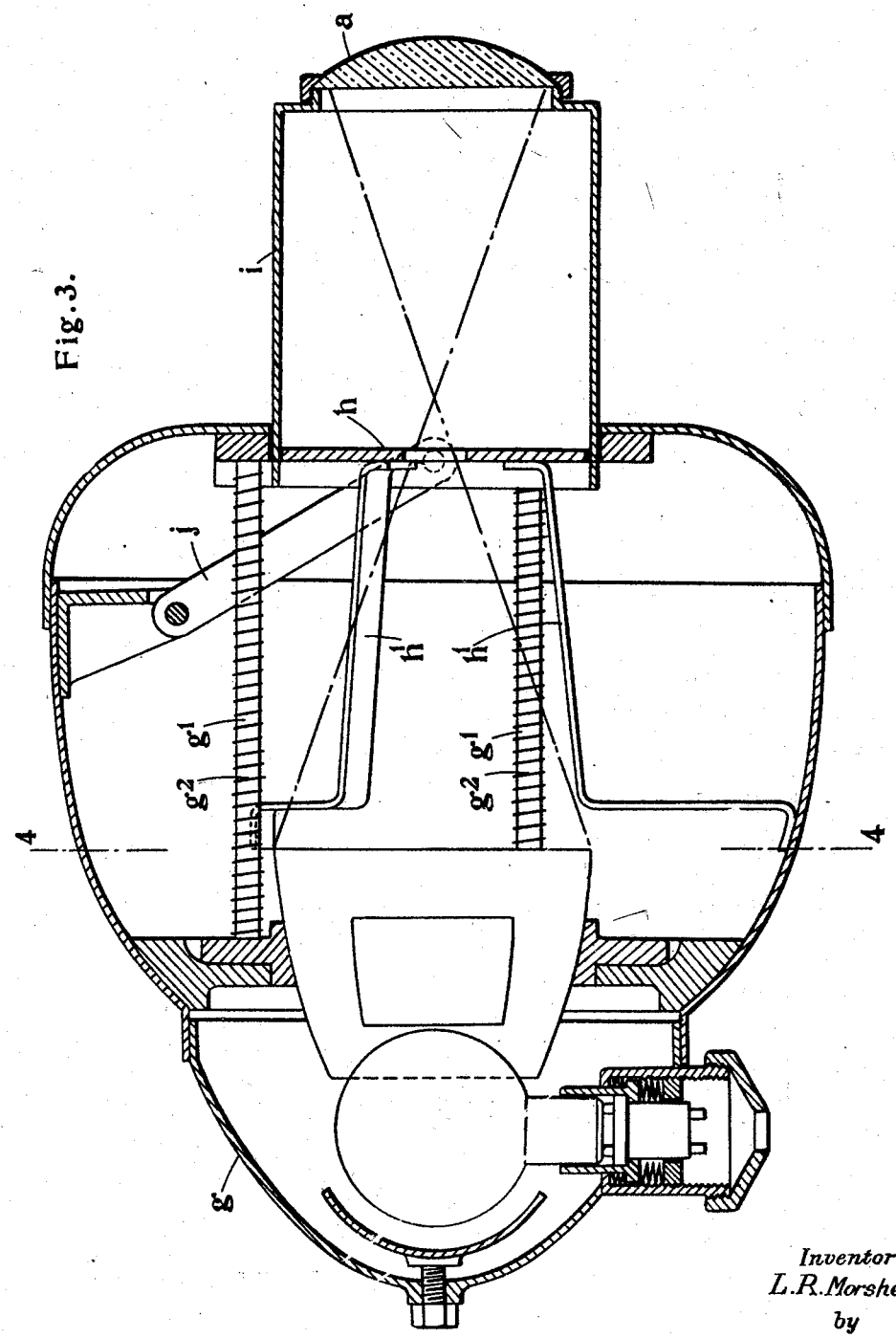
Figure 3 is a diagrammatic sectional elevation of a construction of motor head lamp according to the invention.
Figure 4:
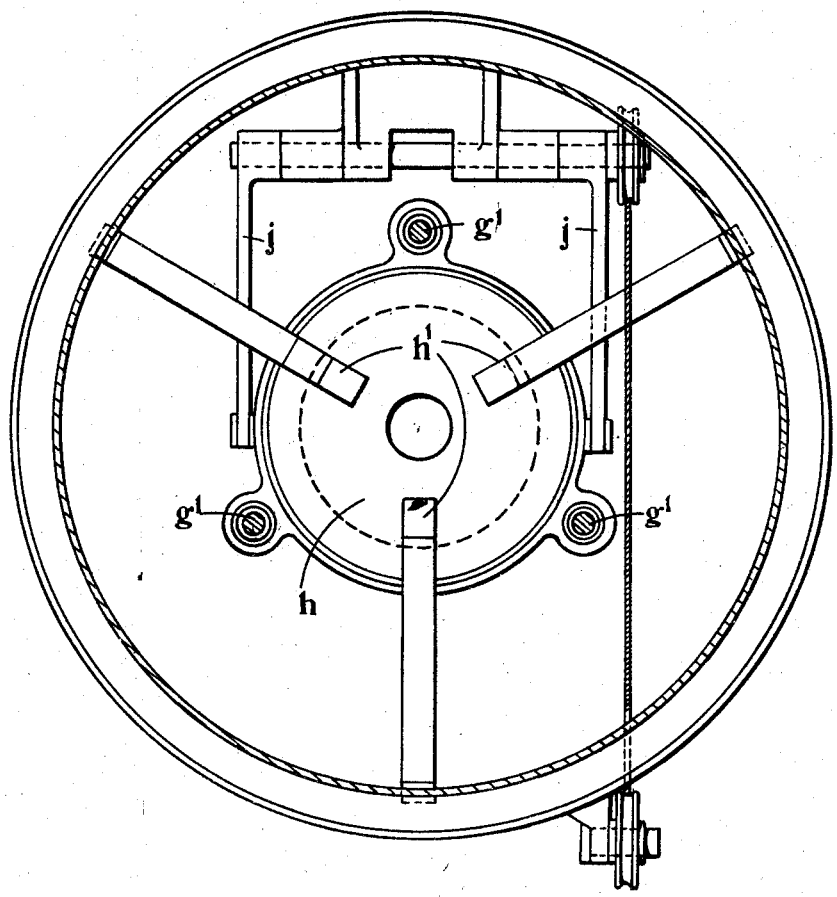
Figure 4 is a corresponding cross-sectional elevation taken on the line 4—4 of Figure 3.

The invention is applicable to motor head lamps and for this purpose may be carried out in the manner that is indicated in Figures 3 and 4 of the accompanying drawings. In this construction, in order to ensure the adjustment of the emerging beam angle between wide limits, varying from an approximately parallel uniformly illuminated and sharply focussed beam with proportionately high intensity of illumination to a wide angle flooding beam with a relatively low intensity of illumination and consequent reduction in glare, a great range of relative adjustment may be provided between the frontal lens and the projector system, so that the crossing point of the beam may be located on either side of the frontal lens. The optical projector system, including the source of light producing the converging beam, is advantageously completely encased by a casing $g$, and the diaphragm or aperture $h$ is carried in a fixed position to the rear of the crossing point by means of a spider-like fitting or arms $h^1$, and the lens $a$ is carried in a cylindrical carrier $i$ slidably mounted in the casing $g$ and secured to an annular supporting ring $i^1$ slidably positioned upon three rods $g^1$ disposed parallel with the axis of the system and maintained in the innermost position by means of helical tension springs $g^2$ disposed upon the said rods. The adjustment of position of the lens carrier is effected by means of two levers $j$ having a transverse pivotal axis in the upper art of the casing $g$ and adapted to be operated by such means as a Bowden wire connection to draw the lens carrier backward against the resistance of the springs $g^2$ from the control point. The lens $a$ is maintained of relatively small diameter in order to avoid the use of a lens of considerable thickness. The source of light is conveniently mounted in the rear portion of the casing in such manner as to be vertically adjustable. By such constructions as indicated, the frontal lens may be adjustably mounted in line with the projected converging crossing beam so that its position may be readily changed to alter the beam angle by means of the operating device controlled from the dash board. With such a motor head lamp, the full illumination could be utilized under all conditions with considerable possible economies in the size and capacity of the lamps employed, and in such manner that varying beam angle and intensity, with corresponding effects upon glare, would at all times be under the ready and instantaneous control of the driver.

The utility of the invention is not confined to the use of a positive lens of a simple type having the effects hereinbefore described. Thus, if a lens or lens combination of a negative type were employed, such as a plano-concave or double concave lens, inverse effects may be obtained on account of movement in relation to the crossing point of the beam. Such a negative lens interposed between the optical projection apparatus and the crossing point of the beam would tend to open out the converging beam towards the parallel, whereas, when located in front of the crossing point away from the source of light, it would open out the diverging beam tending to make it cover a wide flooding angle. One possible advantage of the use of this type of lens would be to shorten the overall length of the apparatus employed, when used for certain forms of spot or flood lighting, and the like. Another important advantage of the use of a negative lens is the fact that there is no projection of an image of the source of light or the projector system under any conditions of use. It will be observed that in the structure shown in Fig. 1 the diaphragm $d$ has its aperture within the light tube, and that in the structure shown in Fig 3 the diaphragm $h$ is located within the light tube, thereby preventing light losses around the diaphragm and ensuring the passage of all light entering the light tube through the diaphragm aperture.

It will be understood that the constructions of apparatus hereinbefore described may be modified without departing from the invention. Thus, the adjustment of position of the diaphragm $d$ may be effected mechanically by means such as the lever and link motion provided for the adjustment of the lens $a$. Alternatively, the adjustment of the lens $a$ may be effected by hand without the use of a link and lever motion.

I claim:

1. An apparatus for the projection of light, more particularly for spot and flood lighting and like purposes, comprising a casing having a light projecting aperture in its front wall, an optical projector carried by the casing for producing a converging beam of high intensity having a crossing point, an apertured plate fixed to the front wall of the casing, guides carried by the casing and said apertured plate, a lens carrier frame adjustable on said guides toward and from the optical projector, a light tube comprising telescopic sections respectively carried by the apertured plate and lens carrier, a refracting lens carried by the latter-named light tube section, and a diaphragm with aperture of adjustable diameter within the light tube and adjustable with the lens carrier so as to be disposed at the crossing point of the beam to determine the projection of a beam of high intensity of narrow angle or to be disposed at a position to the rear of the crossing point of the beam to determine a beam of wider angle and less intensity.

2. A light projecting apparatus of the character set forth in claim 1 wherein tubular light screens are arranged on opposite sides of the diaphragm and telescope the respective sections of the telescopic light tube.

3. A light projecting apparatus of the character set forth in claim 1 wherein a holder for interchangeable obturator disks is mounted between the front wall of the casing and the apertured plate.

4. An apparatus for the projection of light, more particularly for spot and flood lighting and like purposes, comprising a casing, an optical projection system carried thereby for projecting a converging beam of high intensity having a crossing point, a light tube receiving said beam and embodying telescopic sections, one adjustable toward and from said optical projection system, a diaphragm having an aperture, said aperture being within said light tube, thereby preventing light losses around the diaphragm, and a refracting lens carried by the adjustable section of the light tube whereby the lens is adjustable with relation to the optical projection system and whereby the diaphragm is rendered variable as to position between the optical projection system and lens.

LESLIE ROBERT MORSHEAD.